Aug. 25, 1964　　　M. W. LOVELAND　　　3,145,826
MACHINE FOR ORIENTING PEACHES
Filed Dec. 22, 1961　　　　　　　　　　7 Sheets-Sheet 1

INVENTOR:
MALCOLM W. LOVELAND
BY
ATTORNEYS

Aug. 25, 1964  M. W. LOVELAND  3,145,826
MACHINE FOR ORIENTING PEACHES
Filed Dec. 22, 1961  7 Sheets-Sheet 2

INVENTOR:
MALCOLM W. LOVELAND
BY
ATTORNEYS

Aug. 25, 1964

M. W. LOVELAND 3,145,826

MACHINE FOR ORIENTING PEACHES

Filed Dec. 22, 1961

INVENTOR:
MALCOLM W. LOVELAND
BY
ATTORNEYS

Aug. 25, 1964 M. W. LOVELAND 3,145,826
MACHINE FOR ORIENTING PEACHES
Filed Dec. 22, 1961 7 Sheets-Sheet 4
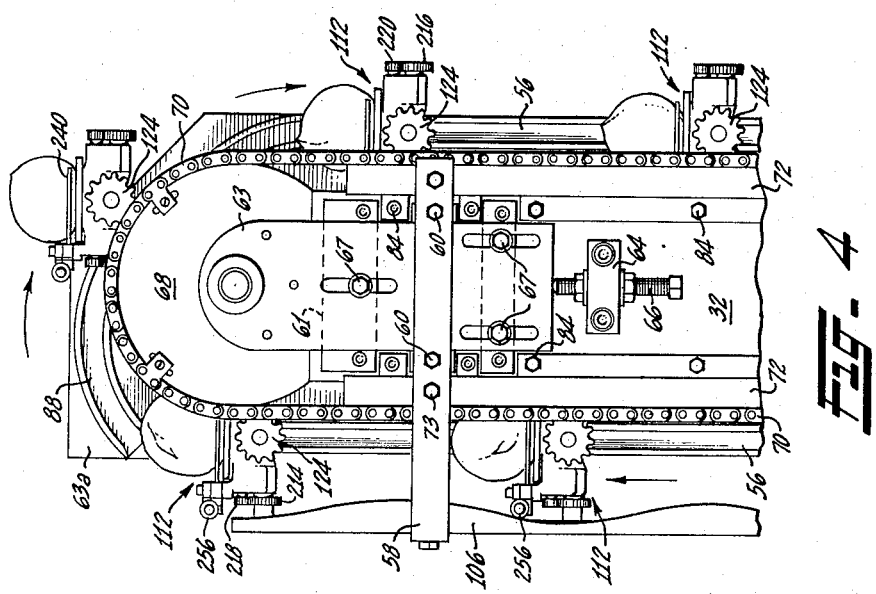
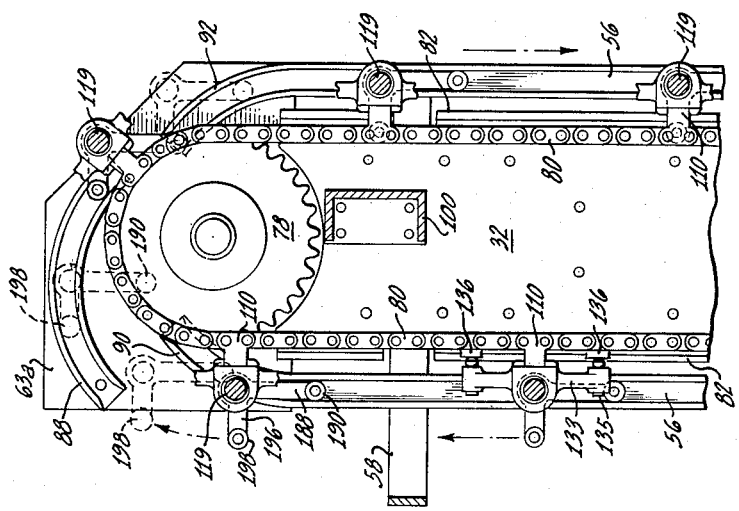
INVENTOR:
MALCOLM W. LOVELAND
BY
ATTORNEYS

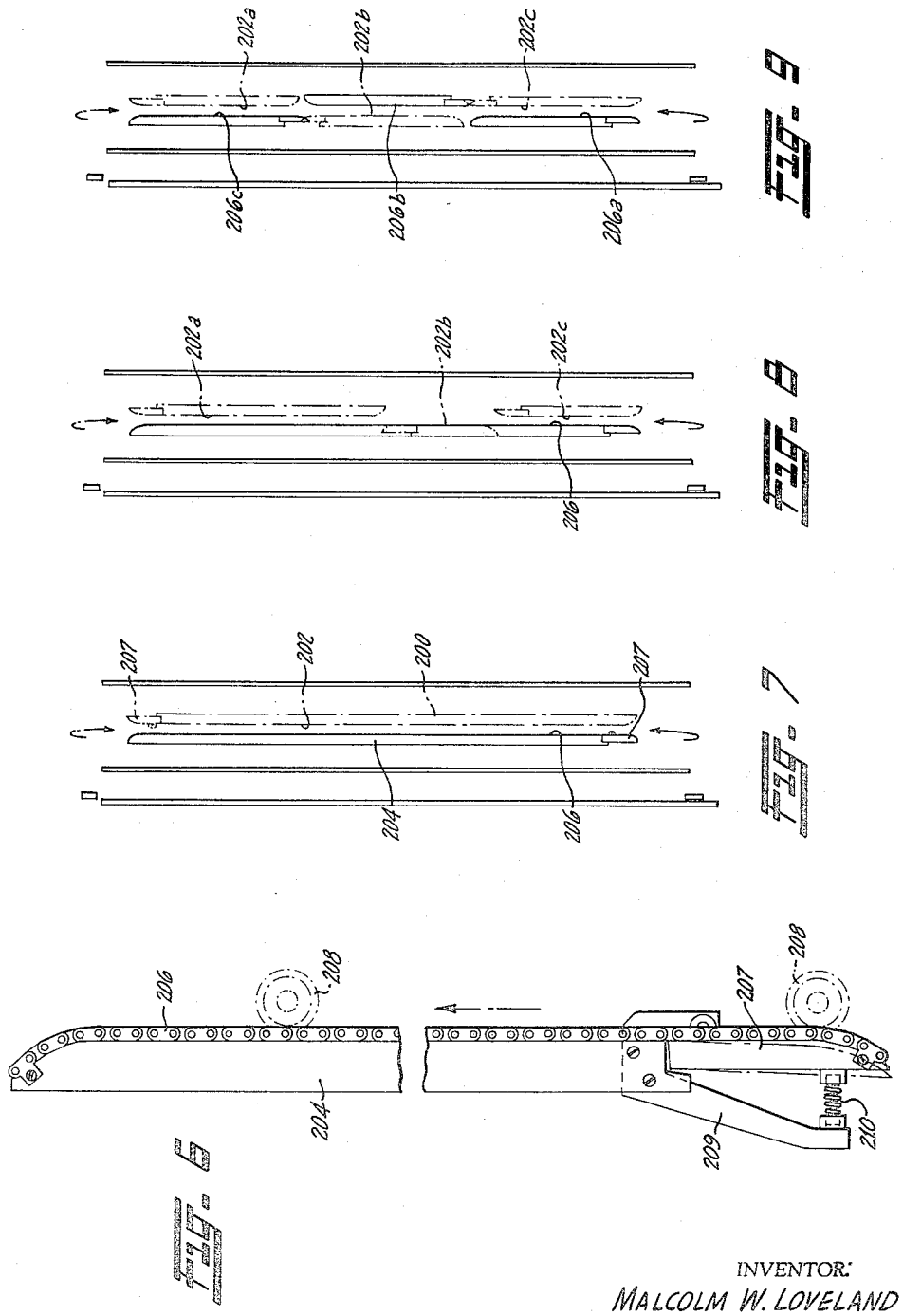

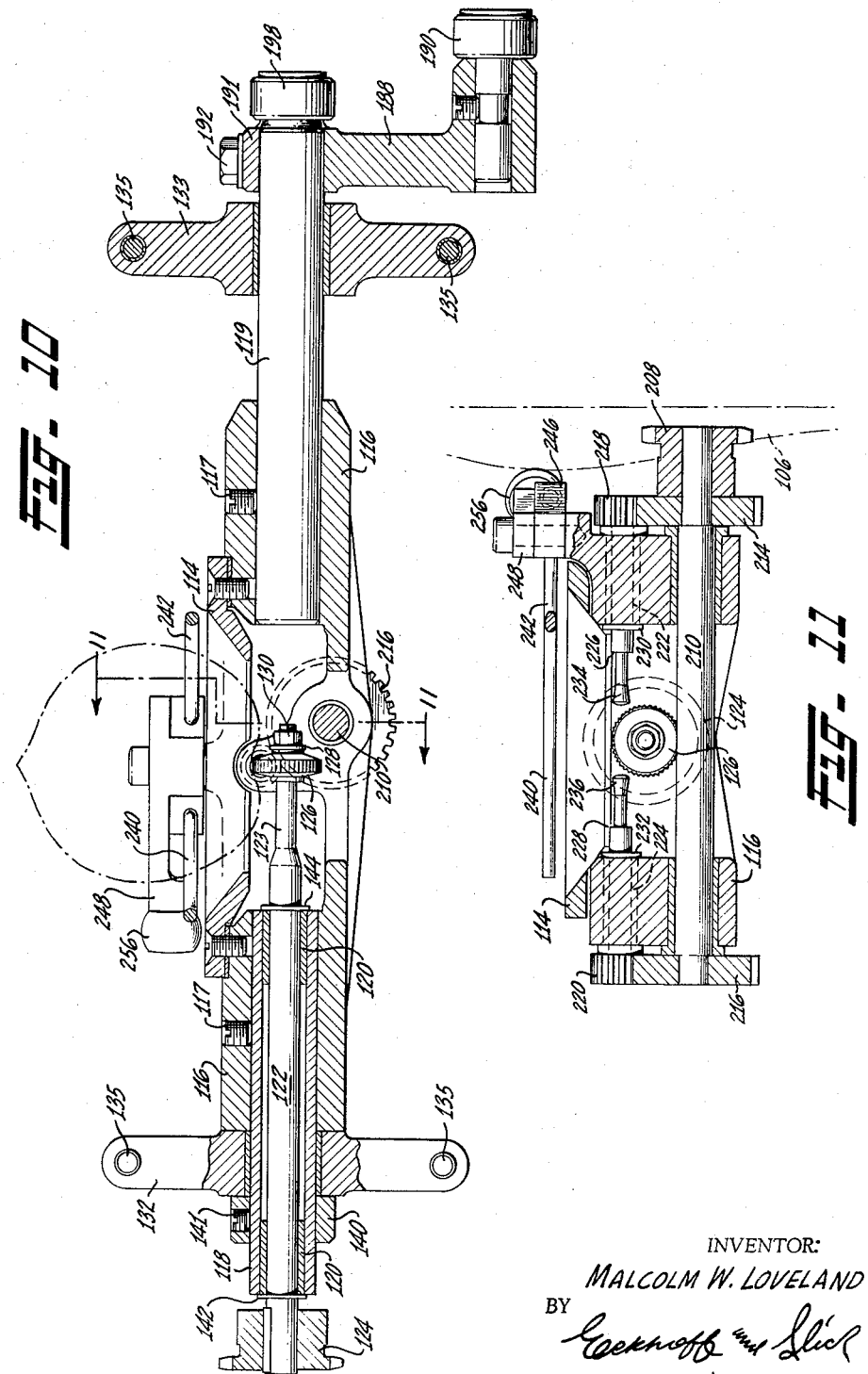

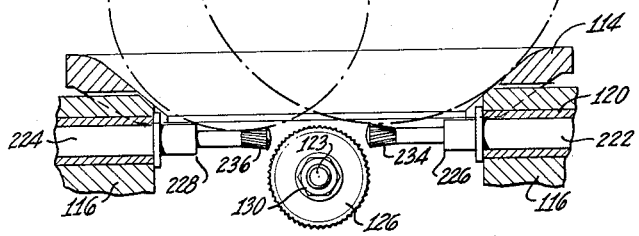
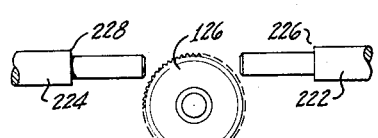
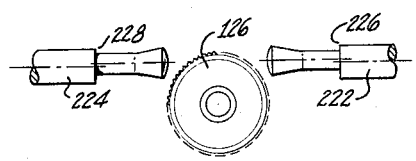
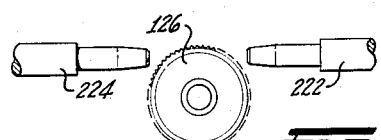
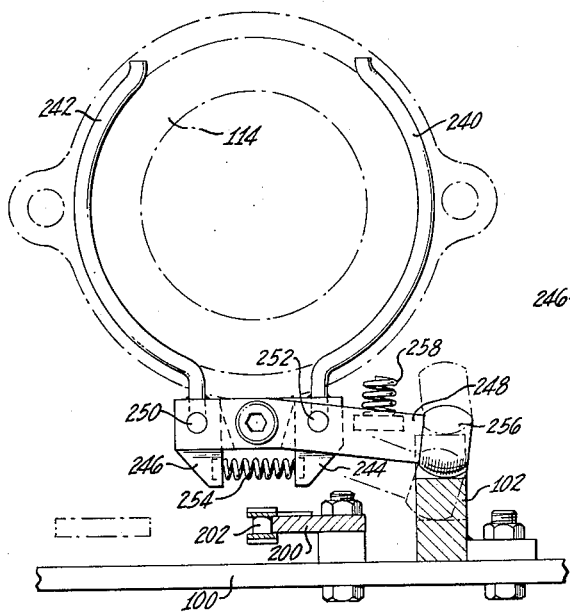
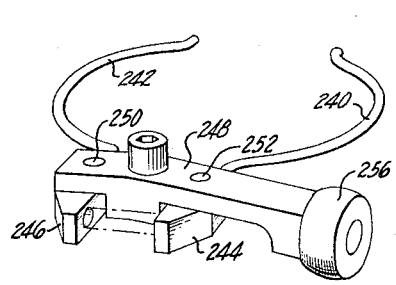

United States Patent Office 3,145,826
Patented Aug. 25, 1964

3,145,826
MACHINE FOR ORIENTING PEACHES
Malcolm W. Loveland, Orinda, Calif., assignor to Atlas Pacific Engineering Company, a corporation of California
Filed Dec. 22, 1961, Ser. No. 161,602
19 Claims. (Cl. 198—33)

This invention relates to a machine for orienting fruit having a suture such as peaches, apricots, and the like. These are characterized in having a suture extending circumferentially and crossing the stem indent to provide a generally ovoidally shaped cavity at the stem end of the fruit with the suture running along the major axis of the generally ovoidal indent.

To meet the highest grade specification for such canned fruit halves, the fruit must be severed within a narrow range on either side of a plane passed through the center of the stem end of the fruit and along the suture axis and along the longitudinal axis of the fruit. Depending on the particular specification applied, this range can be from an eighth to a quarter of an inch. This is quite a rigorous specification and one which is not easily achieved in a mechanical operation.

While various suggestions have been made for orienting devices for such fruit, the machine of the present invention has proven itself to be highly efficient and capable of orienting a minimum of 80% of the fruit fed in commercial operations to meet the foregoing specifications. In addition, this orientation is effected at commercial rates of feed in which each fruit is only permitted a matter of a few seconds for correct orientation.

It is generally a broad object of the present invention to provide an improved fruit orientor, one which is effective in orienting commercial grades of sutured fruit as are handled in the usual cannery.

An additional object of the present invention is to provide a relatively simple fruit orienting device which is inexpensive to build, operate and maintain.

The invention includes other objects and features of advantage, some of which, together with the foregoing, will appear hereinafter wherein the preferred form of orientor of this invention is set forth.

In the drawings accompanying and forming a part hereof:

FIGURE 4 is an enlarged fragmentary side elevation of the topmost portion of the orientor taken on the line 4—4 of FIGURE 2.

FIGURE 5 is an enlarged fragmentary view taken on the line 5—5 of FIGURE 2 showing, in phantom view, the relationship of various parts at closely spaced intervals during the conveying cycle.

FIGURE 6 is a fragmentary side elevation showing a track mechanism which may be used for driving the suture finding pins.

FIGURES 7, 8 and 9 are each diagrammatic views respectively showing alternative track arrangements.

FIGURE 10 is an enlarged sectional view on the line 10—10 of FIGURE 3 showing the structure of one of the fruit supporting dishes and the relationship of the rotating elements employed for finding the stem end of the fruit and the suture.

FIGURE 11 is a view taken on the line 11—11 of FIGURE 10 showing further the relationship between the three rotating elements used for alignment of a fruit carried on the supporting dish.

FIGURE 12 is an enlarged view showing the relation of the several rotating elements and illustrating diagrammatically their action in aligning a fruit.

FIGURES 13, 14, 15 and 18 are views of alternative aligning elements which can be employed for finding the suture of a fruit.

FIGURE 16 is a plan view showing the arcuate fingers employed for moving and ensuring that a fruit does not inadvertently reach a stabilized position unless it is properly aligned.

FIGURE 17 is a perspective view of the assembly including the arcuate fingers showing a portion of their driving mechanism.

General Description

Generally, the apparatus of this invention comprises a narrow, vertical conveyor and orientor positioned between a bulk feed mechanism and a machine designed to halve peaches or similar fruit along the plane of suture of the fruit. The device operates in an essentially sequential fashion to orient the fruit first with the stem indent downwardly and thereafter to orient the suture of the fruit into a predetermined plane. The essential orientation is, in any case, that which locates the suture and, in the present machine, stem end indent orientation is employed as an incident to suture orientation. While it is desirable to locate both the stem indent and the suture, fruit oriented with respect to its suture can be processed to meet the specification as to halving along the suture. A vertical conveyor is provided with individual fruit supports, the latter being so mounted and constructed that the fruit is first elevated on one side and then lowered on the other side of the conveyor and the fruit support being in a vertical plane throughout the period of its transmit from the conveyor loading station to the fruit discharge station. Finally, a transfer mechanism removes the oriented fruit from the conveyor and feeds it to the knife or knives of other fruit processing mechanisms such as a fruit halver and pitter.

The Frame

Figure 1:
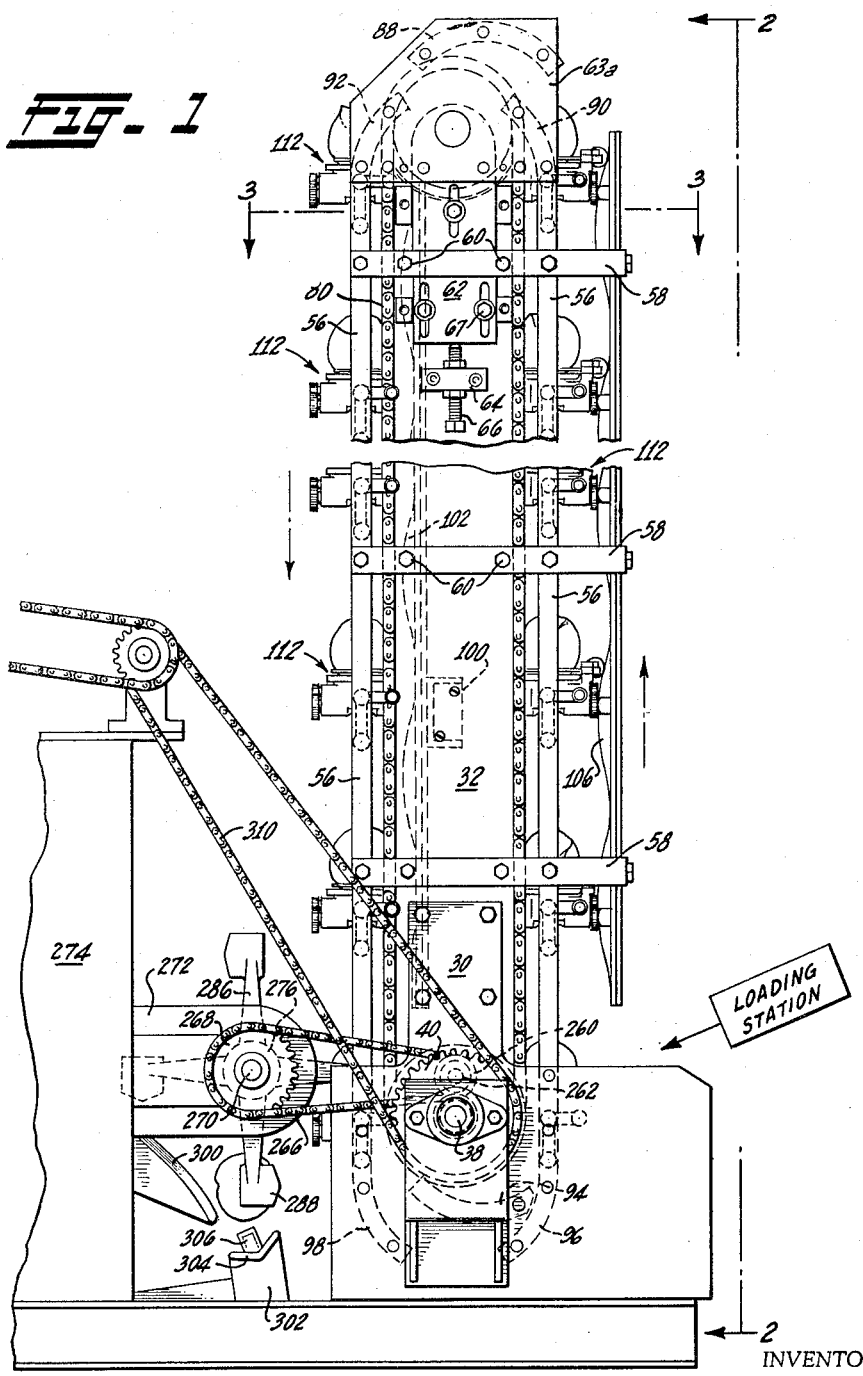
FIGURE 1 is a side elevation of an orienting and transferring mechanism which is disposed between a bulk feed mechanism, not shown, and a halver and pitter mechanism as shown generally at the left of FIGURE 1.
Figure 2:
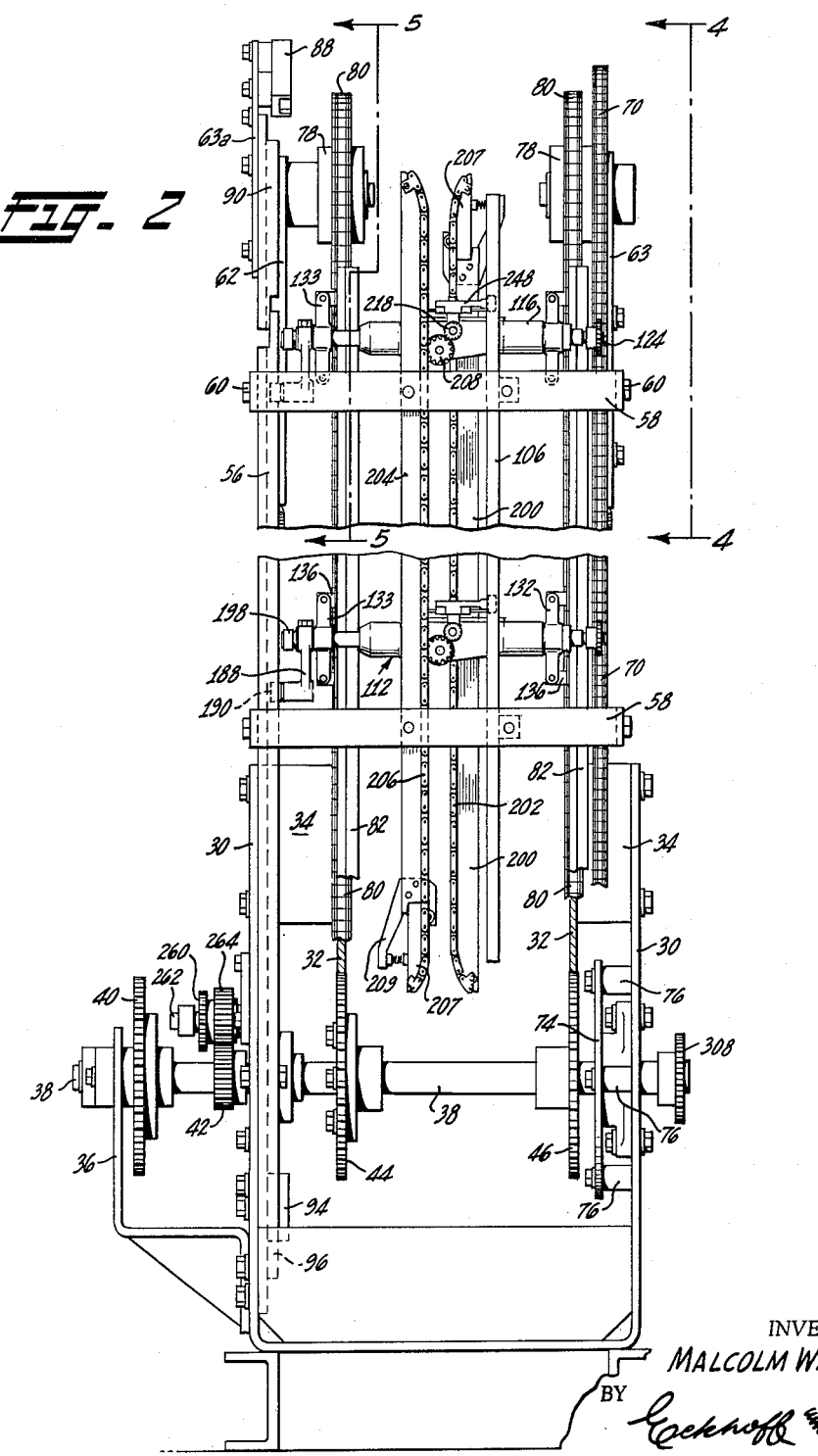
FIGURE 2 is an end elevation of the orienting mechanism of this invention on the line 2—2 of FIGURE 1.
Figure 3:
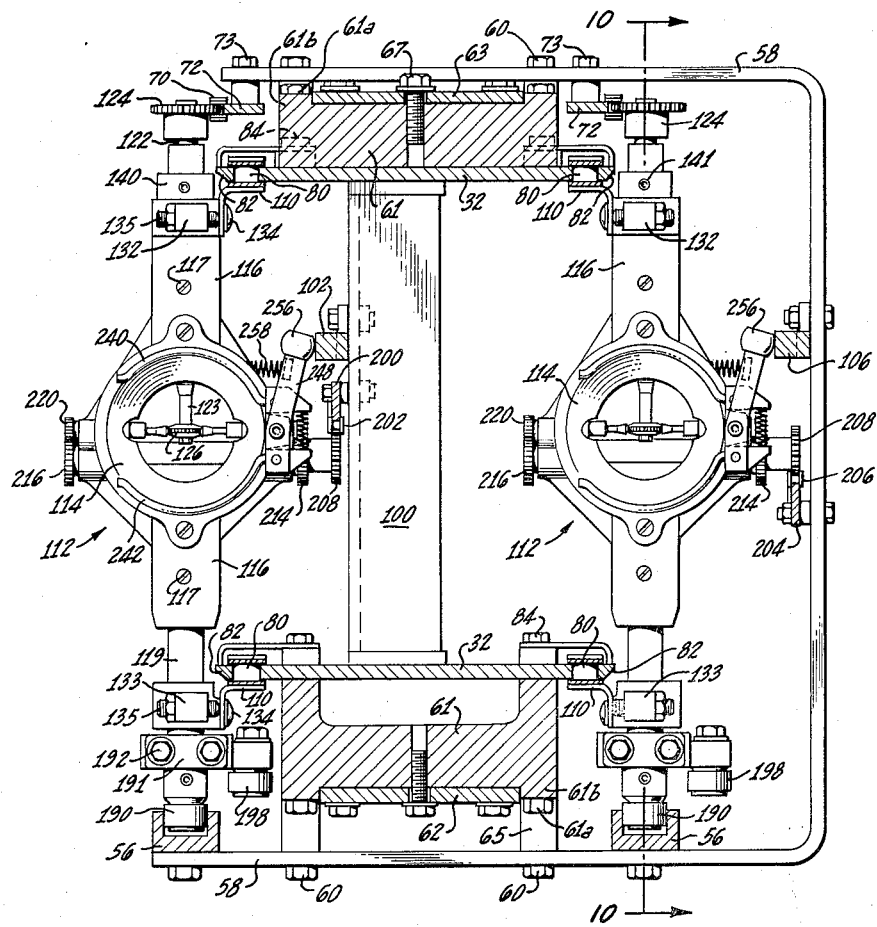
FIGURE 3 is an enlarged plan view, partially in section, of the orientor, taken on the line 3—3 of FIGURE 1.

Referring now to the drawings wherein like characters refer to like parts frame 30 has upright side plates 32 attached and spaced inwardly from spacer blocks 34. Bracket 36, as may be seen in FIGURE 2 is bolted to one side of the frame 30. Shaft 38 is journalled for rotation in the frame 30 and has keyed thereto sprocket 40, gear 42, and sprockets 44 and 46. Bolted to the frame 30 is a pair of upright cam tracks 56, one of which may be seen at the left in FIGURE 2 and both of which appear in FIGURES 1 and 3. Bolted to the exposed surfaces of the cam tracks 56, as seen in FIGURE 1, are vertically spaced U-shaped brackets 58 which are also secured to plates 32 by bolts 60 and spacers 65 and 69. Adjustably mounted on spacer blocks 61, in turn secured to plates 32 by bolts 61a (see FIGURE 3), are plates 62 and 63, the latter of which supports an additional plate 63a (FIGURES 1, 2, 4 and 5). Each spacer block 61 has a boss 61b (FIGURE 3) at either end thereof through which bolt 61a passes and which serves to guide and hold plates 62 and 63. Bolted to each of plates 32 is a bracket 64 (FIGURES 1 and 4), supporting set screw 66 for adjusting the portion of plates 62 and 63. The plates 62 and 63 are also slotted for receipt of studs 67 which are engaged with spacer blocks 61 to permit adjustment of the plates. Mounted at the top end of plate 63 is a stationary arcuate member 68 which supports chain 70 (see FIGURE 4). From the support 68, the chain 70 passes downwardly closely adjacent the guides 72 which, in turn, are secured to brackets 58 by bolts 73 which are provided with suitable spacers, as seen in FIGURE 3. At the lowermost end, the chain 70 passes about the stationary arcuate member 74 (FIGURE 2), which, aligned with arcuate member 68 and guides 72 by means of spacers 76, is bolted to frame 30.

The Conveyor

Journalled in bearings mounted on plates 62 and 63 are opposing sprockets 78 (FIGURES 2 and 5) about which are trained endless link chains 80. These chains pass along the longitudinal edges of plates 32 and about sprockets 44 and 46 at the base of the apparatus. Because of the weight which they support, chains 80 have a tendency to pull away from the plates 32; to prevent this, bracket-supported chain guides 82 (FIGURES 2 and 3) are secured to plates 32 by bolts 84. In FIGURE 2, the chain guides 82 are shown partially broken away to expose the chains 80; the chains in turn are shown broken away so as to expose the underlying plates 32.

Adjustable plate 63a (FIGURE 5) also supports three arcuate cam track segments 88, 90 and 92. The segments 90 and 92 mate with one or the other of vertical cam tracks 56. There is approximately an 80° trackless segment between the upper end of tracks 90 and 92. The function of cam track segment 88 and the reason for the aforementioned trackless segment will be described in greater detail hereinafter. A similar arrangement is provided directly therebeneath wherein three separate cam segments 94, 96 and 98 are attached to the frame 30 as is shown in FIGURES 1 and 2. As will be pointed out hereinafter, these operate in much the same fashion as cam track segments 88, 90 and 92 to cause individual units carried by the conveyor to remain continually in an upright position, even while the units are passing from one side to another of a sprocket wheel and reversing their direction of travel.

As may be seen in FIGURES 1, 3 and 5, channels 100 bridge the space between each of the plates 32 and are secured thereto. To these channels is secured a vertical cam 102. A second vertical cam 106 is bolted to the U-shaped bracket 58. Cam 102 is on the "down" side of the conveyor and cam 106 is on the "up" side of the conveyor.

The Fruit Supports

At spaced intervals along the chains 80 are secured, by means of chain attachment links 110, a series of fruit-supporting units, generally indicated at 112. These may be seen in plan view in FIGURE 3 and in detail in FIGURES 10–17. Each unit consists of a shallow dish 114 having sides sloping downwardly and inwardly and having a centrally disposed opening, the opening being of such a size as seen in FIGURES 10 and 12 that some portion of the fruit is disposed below the lowermost surface of the dish in the absence of additional support from beneath.

At best, the size of the opening is a compromise. Since the fruit usually handled is not closely graded as to size, the opening must be accommodated to the largest and smallest fruit to be handled. The opening should be of such size that the largest fruit nearly touches all around the opening when its stem is down and its suture is located. The angle of the sidewall should be such as to urge the fruit to center and yet not provide so much surface engagement with the fruit that turning of the fruit in the cup is impeded or prevented by too much frictional engagement between the fruit and the sidewall of the cup. Usually a cup sidewall angle of about 10° to 45° will suffice, the preferred angle being about 30°.

In the device shown, the sidewall is shown as being conical with a straight line sidewall. Instead the sidewall can be concave, convex or even corrugated. In addition, while the cup support has been shown as an annulus, one can use other shapes. For example, the cup support can be ovoidal in shape with the major axis of the ovoid extending parallel to and passing through a vertical plane extending through shafts 222–224.

The Orienting Means

Each dish 114 is secured to the housing 116 which, in turn is fixed by set screws 117 to the sleeve 118 and to shaft 119, as seen in FIGURE 10. Rotatably supported within the sleeve 118 by bearings 120 is shaft 122 having sprocket wheel 124 keyed thereto (FIGURE 10). Serrated wheel 126 is secured to the opposite end of the shaft 122, as by washer 128 and nut 130. The serrated wheel is centrally positioned in the opening of cup 114 with its upper edge extending to a point closely adjacent the lowermost edges of the sides of the annular support 114 so that the wheel 126 may engage the surface of a peach on the support, as shown in FIGURE 10. The wheel is of such a size that it fits loosely in the stem end of the peach.

Rotatably secured to sleeve 118 is vertical guide and support element 132 and rotatably secured to shaft 119 is vertical guide and support element 133, which elements are secured to L-shaped chain attachment links 110 by means of screws 134. These guides have set screws 135 which bear against adjacent L-shaped attachment links 136 (see FIGURES 2 and 5) carried by the chains 80 and serve to provide extra support for the fruit support elements 112 so that the ends thereof farthest removed from chains 80 will not drop below the horizontal. Collar 140 is held in place by screw 141. Snap rings 142 and 144 (see at the left of FIGURE 10) together position shaft 122 within sleeve 118.

At the right-hand portion of FIGURE 10, there is shown a crank arm 188 having a cam roller 190 at one end thereof, which crank arm is fixed by yoke 191 and bolts 192 to shaft 119. A second crank arm 196 and cam roller 198 are rotatably mounted thereon, the arm 196 being at a right angle to the arm 188 to form a bell crank assembly. The relationship of the crank arms is best seen in FIGURE 5; as can there be seen, roller 190 rides in either of cam tracks 56 excepting at the topmost and lowermost portions of the conveyor circuit, at which times the roller 190 is disengaged and roller 198 enters track 88 or 94. The supporting elements 132 and 133 rotate as the relationship of the chain 80 and the fruit support assembly changes, but the dish surface 114 is maintained horizontal at all times. It will also be apparent that tracks 88 and 94 are absent between the upper ends of tracks 90 and 92 and between the lowermost ends of arcuate tracks 96 and 98 so that cam tracks 88 and 94 alone govern the position of the dish surface and any binding is avoided.

Also bolted to channel 100 (FIGURE 3) is the vertical plate 200 having link chain 202 fixedly secured thereto along its entire length. A second vertical plate 204, bolted to the U-shaped brackets 58, also supports link chain 206. Each dish assembly 112 is provided with a sprocket 208 (FIGURES 2 and 11) which is positioned to engage either chain 202 or 206, the sprocket being keyed to shaft 210. Also secured to the shaft 210 are gears 214 and 216, the shaft being journalled in the lowermost portion of the housing 116. Spur gears 218 and 220 mesh with spur gears 214 and 216, respectively, and these are keyed to shafts 222 and 224, respectively, and rotatably secured in the housing 116. Shafts 222 and 224 are provided with shoulders 226 and 228, respectively, the edges of which are spaced substantially from snap rings 230 and 232 which assist in holding the shafts 222 and 224 in place. In the preferred form, the exposed ends of each of the last-mentioned shafts terminate in frustroconical elements 234 and 236 which may be knurled as shown in FIGURE 12. The frustroconical elements are preferably of such shape and size that they may fit approximately within the ovoidally shaped stem indent recess, the long axis of which is aligned with the suture.

The aforementioned shoulders 226 and 228 deter the tendency of a small fruit to be readily dislodged by the serrated wheel 126 from its properly oriented position. Because a small fruit will generally have a stem indent in proportion to its size, the smaller stem indent may cause a small fruit to remain in partial contact with the serrated wheel. The rotation of the wheel tends to move such a small fruit axially of the shafts 222 and 224. When a small fruit has moved a short distance from its normal oriented position, it will lose contact with the wheel and rest in a position as is shown in the small dotted circular shape in FIGURE 12 wherein it is balanced on the suture at the stem indent and in a position suitable for proper transfer and entry into the subsequent processing machine.

When only the stem end of the fruit has been located, the opposite suture grooves may be as much as 90° from location. In this position the wheel 126 no longer supports the fruit and the weight of the fruit is supported on the ends of the shafts 222–224. One or the other of the shaft ends will rotate the fruit about a generally vertical axis until the suture is located on the shafts 226 and 228. Rotation in one of the two possible directions is assisted by the contour of the fruit at 90° from the suture wherein the suture is axially closer to the center of gravity of the fruit than are the areas at 90° to the suture.

Several alternative arrangements and structures are possible for the ends of shafts 222 and 224, as shown in FIGURES 13–15. In FIGURE 13 the frustroconical sections are eliminated and the shafts end in smooth cylindrical studs. In FIGURE 14, the frustroconical section are each eccentrically located with respect to the axis of its shaft, as contrasted with the concentric positioning of the frustroconical ends shown in FIGURE 12. The eccentric arrangement permits an intermittent contact between the bottom of the peach and the frustroconical section to cause the peach to turn in a non-uniform fashion. In FIGURE 15, the stubs are tapered.

Figure 18:
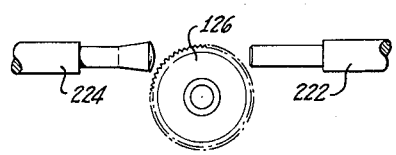

Other combinations of shaft ends are possible. For example, the side wall of an otherwise frustroconical end can be made a curved surface, either convex or concave. Also, as is shown in FIGURE 18, one can use a combination of a plain end and a frustroconical end, the former providing a minimum of turning force to the fruit and the latter a substantial driving or turning force.

Both of the shaft stubs preferably turn in the same direction as will be seen from a study of the arrangement set forth in FIGURE 11. However, they may be caused to turn in opposite directions by interposing an idler gear between either the gear pair 214 and 218 or the gear pair 216 and 220. With some fruit such an arrangement is desirable.

The Bail and Its Function

In FIGURES 16 and 17, there is shown further means of assuring non-uniform rotation and movement of the peach in the supporting dish 114. This means includes the arcuate wire fingers 240 and 242 secured to the blocks 244 and 246. The blocks 244 and 246 are secured to the lever arm 248 by pins 250 and 252 and are capable of pivotal movement relative thereto. Spring 254 extends between the exposed ends of blocks 244 and 246 and permits the arcuate fingers to spread somewhat if an unusually large peach is being oriented. Cam roller 256 rotates at the distal end of the lever arm 248 and is held in contact with cam 102 or 106 by spring 258.

As each cam has an arcuate surface which can be termed wave-shaped or scalloped, as seen in FIGURES 1 and 4, the effect of roller 256 is to oscillate arm 248 and the opposed arcuate fingers horizontally over dish 114 to contact a fruit on the support and move the fruit to engage the wheel 126 and at least one of the stubs of shafts 222 and 224. When the fruit has been properly oriented with its suture bearing on shafts 222 and 224, the fruit is not dislodged by the motion of the wires 240 and 242 but will rock alternately between the angular sides of the cup 114, pivoting on its suture groove in the stem indent about the cylindrical portions of shafts 222 and 224.

When finally properly aligned, the fruit is quite stable because, with the wheel turning freely in the stem indent and shafts 222 and 224 fitting in the grooves forming the suture, the fruit is from ⅛" to ¼" below that position in which only the surface of the fruit engages the cup sidewall and the wheel. With its center of gravity so lowered, the fruit is not readily disturbed from its oriented position.

Rotation of the Suture Finding Means

The lowermost end of plate 204 and the uppermost end of plate 200 are each provided with pivotal extensions 207 (see FIGURES 6 and 7). A spring 210 is extended between the fixed bracket 209 to permit extension 207 to move when sprocket 208 engages chain 206 and accommodate any slight mis-alignment between the teeth on the sprocket and the chain.

FIGURE 7 is a schematic representation of the arrangement just described wherein a single plate-supported, unbroken chain is provided for upward movement as at the left, and a single unbroken chain supported by a single plate provided for downward movement, as at the right, thus maintaining the same direction of rotation of sprocket 208. In FIGURES 8 and 9, alternative systems are shown. In FIGURE 8, the upwardly-moving sprocket wheel 208 engages a chain at the lowermost end thereof and turns entirely in one direction until the top of the circuit is reached. After 180° of rotation of sprocket 78, the first downward chain section 202a is engaged and the sprocket turned in the same direction until the second downward chain section 202b is engaged. Chain section 202b is being shown in phantom as lying directly behind the plate supporting chain 206. Engagement of chain section 202b causes a reversal in rotation. Another reversal takes place when the sprocket wheel thereafter engages the end of chain segment 202c. This recurring reversal of direction permits a more random "searching" action to enable the stuture of the fruit and proper orientation thereof to be achieved before the fruit is discharged from the apparatus.

In FIGURE 9, a more complex system is shown wherein the supporting element 112 begins an upward or a downward circuit, as the case may be, and thereafter sprocket 208 reverses direction twice. The chain sections causing the direction reversal are 206a, 206b and 206c on the upside and 202a, 202b and 202c on the downside. At the point of initial contact of sprocket 124 with each chain element there is placed a pivoted extension 207 as shown in FIGURE 6.

The Transfer Mechanism

FIGURE 1 shows generally the structure of the transfer mechanism used to remove the properly oriented fruit at the fruit discharge station (the lower left-hand side of FIGURE 1), and thereafter feed it to some other device such as the cooperating knives of a halver and pitter. The 4-armed rotating transfer mechanism is driven through sprocket 260 which is keyed to shaft 262 (see FIGURE 2) journalled in the frame 30, the shaft 262 being driven by gear 264 which is also keyed to the shaft 262 and which meshes with gear 42. Endless link chain 266 is reeved about sprocket 268, in turn keyed to shaft 270 which is journalled in bracket 272 supported by the pitter 274. Also keyed to the shaft 270 is a hub 276 which supports four pairs of arms 286 having grips 288 at their outer ends. An identical structure is set forth in detail in copending application Serial No. 77,421 and hence will not be described in further detail here.

The Operation

In operation, power is supplied by a prime mover, now shown, through the endless link chain 310 reeved about sprocket 40 and, in turn, gears 42 and 264 rotate, thus driving sprocket 260 and rotating arms 286. Sprockets 44 and 46 are turned and the endless link chains 80 carrying the spaced fruit supports 112 are advanced in the direction of the arrows appearing in FIGURES 1, 4 and 5. Any suitable feed means may be used to place fruit or other similar fruit having a stem indent and a suture in random position on individual dishes 114 as the dishes move upward from the loading station which appears at the lower right of FIGURE 1. Sprocket wheel 124 of each fruit supporting unit is engaged by the links of stationary chain 70, with the result that shaft 122 is rotated together with serrated wheel 126 as chain 80 advances the assembly 112. This causes the fruit to be rotated about one of its horizontal axes. The wheel 126 may be mounted slightly eccentrically on its supporting shaft to cause the fruit to be moved in a somewhat more random fashion. Simultaneously, the interaction of sprocket 208 and fixed chain 206 causes the pair of frustroconical elements 234 and 236 to be rotated in the same direction, the particular direction depending upon the arrangement of the stationary chains, whether that of FIGURE 7, FIGURE 8 or FIGURE 9. This rotates the fruit about an axis perpendicular to that about which the fruit is rotated through the action of the serrated wheel 126. It will be understood that when the suture of the fruit eventually reaches a position in which it is in alignment with the shafts 222–224 and in the position shown in FIGURE 10 the serrated wheel is contained within the stem end indent but is out of contact with such end. The fruit then rests on the cylindrical portions of the frustroconical elements which portions are of a diameter suitable to mate with the groove-like contour of the suture extending across the stem end. The frustroconical ends approximately fit the elongated shape of the stem indent to maintain the peach centrally of the cup 114. A small peach may be tilted about the shafts 222 and 224 so that it is resting on one of the angular sides of the cup 114 and upon one or both of shafts 222 and 224.

The oscillating movement of the arcuate fingers 240 and 242 is particularly important in the case of smaller peaches so that frictional contact with the angular face of the cup 114 does not offset and cancel the driving effect of wheel 126. When the oscillation of the fingers 240 and 242 has reached the approximate midpoint, most of the weight of the fruit is supported by the wheel 126 and one or both of the shaft ends, thus assuring continued rotation until the stem indent is located by wheel 126, at which time the weight of the peach is supported by both shaft ends. These immediately become effective to find the suture groove across the stem indent.

The movement of the bail is also important in ensuring that a fruit which has come to rest with the wheel in the stem indent and with one or both of the shaft ends engaged with a false suture will be disturbed and its rotation continued by one or both the shaft ends until the true suture is located and the fruit is properly aligned. Thus the fingers of the bail are effective in reducing the number of fruit aligned by the stem end and a false groove such as is provided by a limb suture.

Each individual cup 114 is maintained in an upright orientation by the cooperation of the various cam tracks and followers, as more particularly seen in FIGURE 5. During the upward cycle, the vertically depending crank arm supporting cam follower 190 holds the cup 114 upright. Near the top of the cycle, follower 198 engages track 88 and thereafter follower 190 becomes disengaged. Upon completion of an approximate 90° "ferris wheel" action, follower 190, now in its downward cycle engages track 92 and follower 198 is disengaged from cam track 88. The use of the aforementioned separate track 88 and a corresponding separate track 94 at the base of the conveyor has been found necessary to afford means for maintaining the individual fruit cups 114 horizontal and facing upwardly at all times while avoiding the possibility of a follower remaining stationary while the endless link chains pass over or under the sprockets about which they are reeved, thus tending to rotate dish 114 about the axis 119 resulting in a binding of follower roll in the cam track as the dish approaches the topmost or bottommost point.

Because of the foregoing sequence of events and functions, the proper orientation of the fruit is obtained with greater certainty than is the case where only a single rotating element, e.g., a device in which a rotating and perhaps an oscillating wheel aligns the plane of suture and orients the stem indent downwardly. The possibility of misorienting the fruit after it has once been oriented is minimized, due to the mating of the cylindrical portions of the frustroconical shafts with the groove like formation extending across the stem end of the fruit where the center of gravity of the peach is at its lowest point. The frustroconical ends approximately fit the "football-like" or ovoidal shape of the stem indent and keep the peach centered. At the same time, the use of the three separately rotating elements, i.e., the serrated wheel 126 and the cooperating shaft ends which rotate the fruit through two perpendicular axes, assures that the suture will be "found" and properly aligned before the fruit is discharged from the apparatus, providing, of course, that the orientor is of sufficient height.

The transfer mechanism, including grips 288, may then remove the fruit from the conveyor, as the conveyor-mounted support "ferris-wheels" about sprockets 44 and 46. The speed of rotation of the transfer mechanism is synchronized to that of the conveyor by means of the gears 42 and 264 and the conveyor-mounted supports are spaced so that a pair of grips will envelop a fruit as a pair of arms 286 reach the horizontal. Halvers and pitters generally employ a knife 300 together with oscillating arm 302, to which is attached a bracket having a V-shaped pusher member 304 and a knife 306. Grips 288 deposit fruit on the upstanding edge of knife 300 at a point in time just subsequent to that shown in FIGURE 1.

As pointed out earlier, any conventional mechanical (or manual) feed may be used. Power may be taken from sprocket 308 keyed to shaft 38. See FIGURE 2.

The machine of the present invention has proven highly successful in use, properly orienting more than 80% of the fruit run through the machine and this in a matter of less than 12 to 15 seconds. In practice, the shaft stub ends 234 and 236 are set so close to the wheel as is possible without touching the wheel. The preferred structure is as shown in FIGURE 12, the ends being frustroconical knurled, and concentric with the axis of the shafts on which they are mounted. Utilizing the apparatus setup of FIGURE 12, 78% of a lot of unsized and ungraded peaches were oriented successfully, while 11% of the peaches were oriented because of the presence of a limb suture. A limb suture is a suture-like groove well displaced from the stone-suture and carved by contact with a limb or twig as the fruit developed. When the stubs are made smooth, the orientation dropped to 63%. The straight configuration of FIGURE 13 effected a 68% orientation while the eccentric configuration of FIGURE 14 effected a 75% orientation and the tapered pins of FIGURE 15 effected a 73% orientation. Nearly 75% of these fruit had pronounced limb sutures. On varieties of fruit which do not have as pronounced limb sutures, the number of perfectly oriented fruit was in excess of 90% of those handled.

For peaches, the preferred wheel is about 13/16th of an inch in diameter, just sufficient to clear in the average stem end indent of the peaches. It is approximately 1/8 inch wide, serrated and concentric with the shaft on which it is mounted, although it may be eccentrically mounted.

Obviously, many modifications and variations of this invention may be made without departing from the spirit and scope thereof, and therefore only those limitations should be imposed as are indicated in the appended claims.

I claim:
1. In an orientor for fruit having a suture:
   (a) a fruit support having sides contoured downwardly and inwardly;
   (b) said fruit support having an opening centrally thereof of a size sufficient to permit a substantial portion of a fruit to depend below the support;
   (c) means supporting said fruit support in a horizontal position;
   (d) a first rotatable shaft extending beneath the fruit support;
   (e) a wheel mounted on said first shaft and rotatable therewith in a vertical plane extending perpendicularly to the plane of the bottom of said fruit support;
   (f) the upper edge of the wheel extending to a point closely adjacent to the bottom of said fruit support whereby the wheel may engage the surface of a fruit carried by said fruit support;
   (g) said wheel being of such a size that the wheel may freely enter the stem end indent of a fruit;
   (h) a second rotatable shaft positioned on one side of the periphery of said wheel with a fruit engaging end on said shaft closely adjacent the upper edge of said wheel;
   (i) a third rotatable shaft positioned on the other side of the periphery of said wheel with a fruit enaging end on said shaft closely adjacent the upper edge of said wheel;
   (j) the longitudinal axes of the second and third shafts being substantially aligned and extending essentially horizontally and at substantially 90° to the axis of said first shaft and through said vertical plane;
   (k) and means for rotating said shafts.
2. The fruit orienting device of claim 1 wherein the fruit engaging end of at least one of the second and third shafts approximates a frustum of a cone with the base of the cone adjacent the wheel, each of said fruit engaging ends being of such size and shape that it fits within the suture of such fruit.
3. The fruit orienting device of claim 1 wherein the fruit engaging end of at least one of the second and third shafts is a frustum of a cone concentric with its shaft with the base of the cone adjacent the wheel and each of said fruit engaging ends being of such size and shape that it fits within the suture of such fruit.
4. The fruit orienting device of claim 1 wherein the fruit engaging end of at least one of the second and third shafts is a frustum of a cone eccentric with its shaft with the base of the cone adjacent the wheel, and each of said fruit engaging ends being of such size and shape that it fits within the suture of such fruit.
5. The fruit orienting device of claim 1 wherein the upper edge of each fruit engaging end of each of the second and third shafts is substantially in a horizontal plane passing through the top of said wheel, each of said fruit engaging ends being of such size and shape that it may fit within the suture of a fruit.
6. The fruit orienting device of claim 1 wherein the second and third shafts rotate in opposite directions, each of said fruit engaging ends being of such size and shape that it fits within the suture of a fruit.
7. The fruit orienting device of claim 1 wherein the direction of rotation of at least one of the second and third shafts is reversed at least once during orientation of a fruit.
8. The fruit orienting device of claim 1 wherein the fruit engaging end of each of the second and third shafts is concentric with the axis of the shaft and the end of each shaft is adjacent the upper periphery of the wheel, each of said fruit engaging ends being of such size and shape that it fits within the suture of the fruit.
9. The fruit orienting device of claim 1 wherein the second and third shafts each have a fruit engaging shoulder thereon closely adjacent the lower edge of said opening.
10. In an orientor for fruit having a suture:
    (a) a fruit support having sides contoured downwardly and inwardly;
    (b) said fruit support having an opening centrally thereof of a size sufficient to permit a substantial portion of a fruit to depend below the support;
    (c) means supporting said fruit support in a horizontal position;
    (d) a first rotatable shaft extending beneath the fruit support;
    (e) a wheel mounted on said first shaft and rotatable therewith in a vertical plane extending perpendicularly to the plane of the bottom of said fruit support;
    (f) the upper edge of the wheel extending to a point closely adjacent to the bottom of said fruit support whereby the wheel may engage the surface of a fruit carried by said fruit support;
    (g) said wheel being of such a size that the wheel may freely enter the stem end indent of a fruit;
    (h) a second rotatable shaft positioned on one side of the periphery of said wheel with a fruit engaging end on said shaft closely adjacent the upper edge of said wheel;
    (i) a third rotatable shaft positioned on the other side of the periphery of said wheel with a fruit engaging end on said shaft closely adjacent the upper edge of said wheel;
    (j) the longitudinal axes of the second and third shafts being substantially aligned and extending essentially horizontally and at substantially 90° to the axis of said first shaft and through said vertical plane;
    (k) means for rotating the fruit shaft;
    (l) means for rotating said second and third shafts;
    (m) a pair of opposed arcuate fingers supported and positioned parallel to and above the upper surface of the fruit support;
    (n) and means for moving the said fingers to engage a fruit on said support and move the fruit into a position in which its weight bears on at least one of the rotating members to effect rotation of the fruit until the suture of the fruit is aligned with the second and third shafts.
11. The fruit orienting device of claim 1 wherein the fruit engaging end of at least one of the second and third shafts approximates a frustum of a cone with the base of the cone adjacent the wheel, each of said fruit engaging ends being of such size and shape that it fits within the suture of such fruit.
12. The fruit orienting device of claim 1 wherein the fruit engaging end of at least one of the second and third shafts is a frustum of a cone concentric with its shaft with the base of the cone adjacent the wheel and each of said fruit engaging ends being of such size and shape that it fits within the suture of such fruit.
13. The fruit orienting device of claim 1 wherein the fruit engaging end of at least one of the second and third shafts is a frustum of a cone eccentric with its shaft with the base of the cone adjacent the wheel, and each of said fruit engaging ends being of such size and shape that it fits within the suture of such fruit.
14. The fruit orienting device of claim 1 wherein the upper edge of each fruit engaging end of each of the second and third shafts is substantially in a horizontal plane passing through the top of said wheel, each of said fruit engaging ends being of such size and shape that it may fit within the suture of a fruit.
15. The fruit orienting device of claim 1 wherein the second and third shafts rotate in opposite directions, each of said fruit engaging ends being of such size and shape that it fits within the suture of a fruit.
16. The fruit orienting device of claim 1 wherein the direction of rotation of at least one of the second and third shafts is reversed at least once during orientation of a fruit.
17. The fruit orienting device of claim 1 wherein the fruit engaging end of each of the second and third shafts is concentric with the axis of the shaft and the end of each shaft is adjacent the upper periphery of the wheel, each of said fruit engaging ends being of such size and shape that it fits within the suture of the fruit.

18. The fruit orienting device of claim 1 wherein the second and third shafts each have a fruit engaging shoulder thereon closely adjacent the lower edge of said opening.

19. In a fruit orienting device:
  (a) a fruit support having an upper fruit supporting surface and an opening disposed centrally thereof;
  (b) means supporting the fruit support in a horizontal position;
  (c) fruit orienting means including at least three elements each rotatable in the said opening of said fruit support and each being capable of contacting the bottom of said fruit to turn a fruit about at least two axes;
  (d) a pair of opposed arcuate fingers supported and positioned parallel to and above the upper surface of said fruit support;
  (e) and means for moving the said arcuate fingers back and forth over the fruit support to move a fruit thereon to engage at least one of said rotatable elements to rotate the fruit until a desired orientation of the fruit is obtained.

References Cited in the file of this patent
UNITED STATES PATENTS
2,980,232   Skog _____ Apr. 18, 1961